United States Patent Office 3,546,192
Patented Dec. 8, 1970

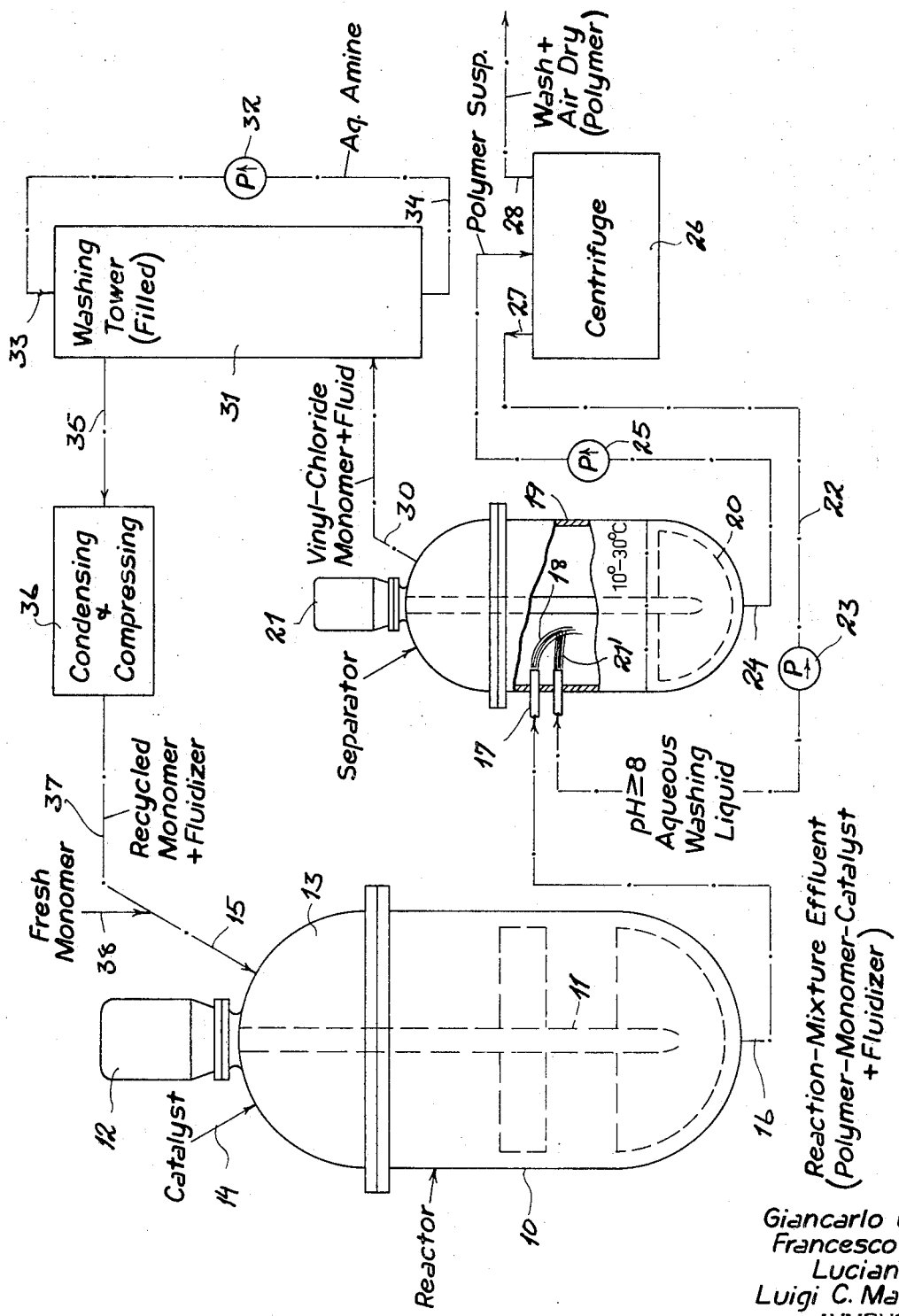

3,546,192
PROCESS FOR THE CONTINUOUS RECOVERY OF POLYVINYLCHLORIDE FROM A CONTINUOUS LOW TEMPERATURE POLYMERIZATION
Giancarlo Borsini, Francesco Visani, Luciano Lodi, and Luigi Ciligot Magagnin, Milan, Italy, assignors to Montecatini Edison S.p.A., Milan, Italy
Filed June 8, 1966, Ser. No. 556,148
Claims priority, application Italy, June 14, 1965, 13,276/65
Int. Cl. C08f *1/06, 3/30, 47/24*
U.S. Cl. 260—92.8                            5 Claims

ABSTRACT OF THE DISCLOSURE

A process for preparing vinylchloride polymers in which vinylchloride is continuously polymerized at a temperature below 25° C. and preferably between 0° C. and —80° C. in the presence of a catalyst component based on a trialkylboron, and, optionally, in the presence of fluidizing substances for the reaction mixture, by continuously feeding the monomeric component and the catalyst component into a reaction vessel. The reaction mixture is continuously withdrawn and treated with an aqueous washing solution having a pH of at least 8 at a temperature between 10° and 30° C. The unconverted monomer is continuouslly vaporized by heat exchange with the washing solution and is treated with a basic solution adapted to retain the traces of catalyst contained in the monomer which is recycled to the reaction vessel to constitute at least part of the monomeric component introduced thereto.

---

Our present invention relates to a process for polymerizing vinyl chloride and, more particularly, to a low-temperature polymerization process for vinyl-chloride monomer and the recovery of a uniform high-quality polymeric material from such polymerization.

Mass polymerization of vinyl chloride has been carried out heretofore at room temperature (e.g. 20° to 25° C.) and at elevated temperatures in a continuous system. The resulting polymers have chemical and physical properties, connected with the stereo-regularity of the molecular structure, which are not fully satisfactory for many purposes (e.g. the production of fibers, filaments, films, sheets and other fabricated bodies). It has been found, as set forth in the commonly assigned copending applications Ser. No. 411,588 now abandoned and 528,321 now Pat. No. 3,415,797, filed respectively Nov. 16, 1964 and Dec. 1, 1965 and entitled Process for Producing Vinylic Polymers and Process for Polymerization of Vinylic Monomers, that polymerization of vinyl chloride at low temperatures yields a polymer whose physical and chemical properties are vastly superior to those of the polymer obtained by a polymerization system operating at room temperature or higher. The term "low-temperature polymerization" is used herein to define a polymerization system operating at a temperature equal to or less than the boiling point of the monomer at atmospheric pressure, such low-temperature polymerization being carried out generally at temperatures well below 0° C. Apparently as a consequence of the high stereoregularity and uniformity of the polymers obtained by low-temperature polymerization, the physical characteristics (in terms of strength, color, resistance to thermal deterioration and chemical attack, and the like) are better than those of high-temperature polymerization products. Mass polymeribation at low temperatures may also be carried out in continuous processes, i.e. maintaining the concentration of the polymer and the catalyst system within the reactor substantially constant, by continuously removing at a constant rate a portion of the product and reaction system while continuously introducing a corresponding quantity of monomer and catalyst. While it has been found that continuous processes of this nature are industrially advantageous by comparison with discontinuous processes, it is observed that difficulties arising when attempts are made to recover the polymer from the reaction mixture. Thus, if the temperature of the effluent reaction mixture tends to rise upon its withdrawal from the reactor, the character of the polymerization and the quality of the polymer change. Moreover, since the catalyst and a substantial proportion of monomer are present in the effluent reaction mixture, considerable quantities of polymer may be formed after withdrawal, such polymeric materials being nonuniform by comparison with the desired polymeric mass and having a tendency to discoloration; the undesired formation of the polymer is also significant in that the polymer formed after withdrawal, in the piping systems or the like leading from the reactor, tends to obstruct the further passage of the reaction mixture and thus interrupt the continuous nature of the process.

Efforts to discharge the reaction mass while cooling it to prevent further polymerization and minimize continuation of polymerization have not proved wholly satisfactory because of the complexity of such processes, the need for complex and massive equipment, the fact that the polymer is relatively nonuniform and evidences poor physical characteristics, and the fact that the polymer is not always obtained in the most satisfactory condition.

It is, therefore, the principal object of the present invention to provide an improved method for the polymerization of vinyl chloride at low temperatures which enables the recovery of the polymer in an efficient but relatively simple manner and eliminates tendencies toward nonuniformity of the polymer.

A further object of this invention is to provide an improved process for the low-temperature polymerization of vinyl chloride which eliminates the need for complex and expensive equipment, permits the recovery of a high-quality uniform polymer, prevents obstruction of the continuity of the process and yields a polymer particularly suited for use in the production of vinyl chloride fibers and filters.

We have discovered that the disadvantages characterizing earlier vinyl polymerization systems operating at low temperatures and especially the drawbacks arising from earlier methods of recovery of, the polymer from the reaction mixture, can be eliminated, in a system of this nature, wherein a portion of the reaction mixture (containing polymer, residual monomer and catalyst system) is continuously withdrawn from the reactor, by the steps of intimately contacting the withdrawal or effluent portion of the reaction mixture with water containing a washing agent and maintained at a temperature between substantially 10° and 30° C., rapidly removing residual monomer from the aqueous/reaction-effluent mixture by evaporation of the monomer (which is recycled to the reactor in a continuous process); and thereafter removing from the aqueous/effluent mixture the polymer by centrifugation.

Thus it has been found surprisingly that the intimate contact of the effluent reaction mixture, whose catalyst system preferably includes organic boron derivatives (e.g. trialkyl boron) and fluidifiers for maintaining the fluidity of the reaction mass (e.g. as described in the commonly assigned copending application Ser. No. 411,588, now abandoned, filed Nov. 16, 1964), yields a polymer in the form of a powder whose coloration is entirely uniform and is free from much of the tendency of discoloration upon heating characterizing earlier polymers. The washing agent is preferably a basic compound having at least an inorganic portion and in sufficient quantity to maintain the pH of the aqueous washing solution to a value of at least 8. For this purpose, the washing agent can be an alkali metal or alkaline-earth metal hydroxide or basic salt whose anion is an anion of a corresponding acid which is weaker than the base corresponding to the respective cation. Advantageously the compound may include an anionic or acid group with surface-active character (e.g. a long-chain fatty acid group) capable of increasing the wettability of the polymer and thus the efficiency with which it may be washed by the alkaline solution. Best results are obtained when the washing agent raises the pH to 8 or above and is present in a concentration ranging from 0.5 to 10 gr./liter of the washing liquid. The most effective washing agents have been found to be sodium hydroxide, sodium carbonate, sodium phosphate and sodium laurate. Surprisingly, it has been discovered that the washing of the effluent reaction mixture with water at the relatively elevated temperature of 10° to 30° C., when the water contains a washing agent as described above, does not give rise to the disadvantageous formation of additional polymer when carried out with a reaction mixture containing a boron derivative catalyst system, residual vinyl chloride monomer, low-temperature polyvinyl chloride product and the fluidifiers described in either or both of the aforementioned copending applications. The monomer which is rapidly removed from the effluent mixture by evaporation, is freed from all traces of the depleted catalyst and returned after recondensation and in a recycling step to the polymerization reactor. The term "depleted catalyst" as used herein is intended to identify a catalyst component which is abstracted from the reaction vessel in the effluent although, for the most part, the catalyst will retain substantial activity. Concommitantly, it may be observed that a similar washing of the effluent by intimate contact with pure water fails to yield polymeric materials whose characteristics approach those obtainable by the system of the present invention. Thus it appears that the presence of the washing agent facilitating the aqueous treatment of the polymer is critical to the purposes of the present invention.

While applicants do not desire to be bound by any theory as to the surprising effectiveness of the process described generally above, it is believed that the basic substance contained in the washing water facilitates (by promoting dissociation) removal of decomposition products of the alkyl boron catalyst system which may be entrapped or adherent to the polymer; this view is based upon the fact that trialkyl boron gives rise to oxydation products which are soluble in aqueous alkaline media.

According to a further feature of this invention, the intimate contact between the effluent reaction mixture and the washing water is produced by homogeneously dispersing the reaction mixture in the washing liquid by subjecting the effluent stream to a jet of the washing liquid. Inasmuch as the liquid temperature (10°–30° C.) produces a substantially instantaneous vaporization of the monomeric component the temperature of which, before the treatment with the washing liquid, is the polymerization temperature—e.g. 40° C., it appears that this step acts to eliminate any substantial monomer to participation from further reaction. In more general terms, it can be stated that it is necessary, in accordance with the present invention, to form a homogeneous and fine dispersion of the polymer in the washing solution both immediately upon its contact with the washing solution and thereafter by continuously agitating the aqueous/reaction-effluent mixture. This ensures that flakes or agglomerates and foams of the polymers will not form on the surface of the washing bath. It will be understood that the development of such foams and crusts upon the surface of the bath generally include entrapped monomer which may react to form a polymeric material of sharply different characteristics from those of the polymeric material formed in the reactor. In fact, the system of the present invention appears to operate in short-stopping the polymerization reaction by substantially instantaneous elimination of the monomer from the effluent. It has also been observed that the use of a washing liquid jet to initiate intimate contact between the cascade or stream of the effluent is important in that it promotes a rapid heat transfer between the washing liquid and the effluent to raise the temperature of the latter above the boiling point of the monomer.

According to a further feature of this invention, the reaction effluent contains one or more fluidifiers of the type and in the proportions set forth in the commonly assinged copending applications discussed above so that the effluent entering into intimate contact with the washing liquid is characterized by a high degree of fluidity; in the absence of such fluidifiers, it is observed that the polymer has a tendency toward agglomeration which is promoted by the separation processes carried out in accordance with the present invention. Conversely, when such fluidizers are present in the effluent, the evaporation of the monomer and dispersal (with washing) of the polymer in accordance with the invention yields the polymer in a powdery or finely divided form with a high degree of uniformity. The reaction effluent/aqueous mixture must be agitated after its collection to prevent any stand, for relatively long periods, of the polymer in the alkaline solution and reaction mixture since there is, upon such stand, a tendency toward further polymerization or modification of the polymer. This change in the characteristics of the polymer may be due to the fact that wet suspended polymeric material may come into contact with the effluent before total elimination of the monomer at the washing temperature so that a small easily degradable polymeric fraction may form. Another possible explanation is that the polymer in the washing liquid may absorb monomer from one of the phases of the system and, upon contact with residual catalyst, may give rise to further polymerization. It appears that both of these latter processes are effectively terminated by the use of the jet of washing liquid mentioned above when a cascade stream of the effluent is subjected to the jet of alkaline washing solution as it is introduced into the upper part of the separation vessel; in the lower part of this vessel, where the alkaline washing liquid and polymer suspension is retained for a short period, stirring is carried out with the suspension being continuously removed and conveyed to a centrifuge. After separation of the polymer, the alkaline solution can be reused by recycling it to the separation apparatus. The total contact time of the polymer suspension and the monomer in the liquid or gaseous state can be reduced substantially to a maximum of 10 minutes although generally not more than several minutes.

According to a further feature of this invention, the fluidifiers used in the polymerization reactor have boiling points of the order of that of the vinyl chloride monomer and, at any event, less than the temperature of the washing liquid so that the fluidifying substances are recovered with residual monomer from the reaction effluent upon treating the latter with the washing liquid. Furthermore, the fluidifying substances should be insoluble in water so that they can be completely recovered without a stripping stage. The fluidifying substances may be the mono- and polychlorinated saturated or unsaturated aliphatic hydrocarbons having from one to six carbon atoms (e.g. chlorinated methanes, ethanes, ethylenes and propylenes); chlorinated cycloparaffinic hydrocarbons such as the chloro-cyclohexanes; chlorinated aromatic mono- and polynuclear hydrocarbons; chlorinated cyclic and acyclic compounds containing one or more heteroatoms (especially oxygen) including the chlorinated alkane and alkene ethers, the chlorinated furanes, hydrofuranes and the like. Experiments have shown that other halogenated cycloparaffinic hydrocarbons, alkanic and alkenic lower hydrocarbons, aromatic hydrocarbons and compounds containing heteroatoms (e.g. the bromine- and fluorine-substituted compounds corresponding to the chlorinated compounds mentioned above) are effective as fluidifiers for the reaction mass.

The fluidifying substances may be used individually or in mutual admixture and in wide ratios with respect to the monomeric component originally present in the reaction mass. Best results are obtained when between 0.5 and 150 parts by weight of the fluidifying substance or component (one or more fluidifying substances) is used for 100 parts by weight of the monomeric component (one or more vinyl monomers). It has been found that the present process is particularly suited for the preparation of polymerization products (i.e. homo- or copolymers) containing a minimum of 60% by weight and preferably in excess of 80% by weight of chemically combined vinyl chloride. The process is carried out generally at a temperature below 25° C. and preferably below 0° C. (i.e. between substantially −80° C. and 0° C.).

The fluidifying component may also be in part an organic unsaturated compound, e.g. low-molecular weight olefinic and acetylenic compounds containing at least one unsaturated bond and preferably a plurality thereof. Of particular advantage for the purposes of the present invention are hydrocarbons of this class containing four and five carbon atoms and having preferably conjugated unsaturated bonds. Thus compounds such as the butadienes, pentadienes and cyclopentadienes, alkyl derivatives and/or aryl-substituted dienes and halogen-substituted dienes have been found to be highly effective for the purposes of the present invention as have compounds having at least one olefinic bond and at least one acetylenic bond. Suitable compounds of the latter class include monovinyl acetylene and compounds with similar skeletons. While best results are obtained with compounds whose molecules contain only four or five carbon atoms, it may be noted that the operable class includes also higher molecular weight compounds in which the basic unsaturated chain has plural unsaturated bonds and four or five carbon atoms. We have discovered that the most effective results are obtained when these unsaturated hydrocarbons are used in amounts ranging between 0.0001 and 0.5 part by weight per 100 parts by weight of the monomer and, within this range, between substantially 0.005 and 0.05 part by weight of the multiple-unsaturated hydrocarbons per 100 parts of the monomer, quantities within the latter range being of noticeably better effect.

The gaseous product removed from the separation vessel (consisting essentially of vinyl chloride monomer and fluidizing component) is treated in a washing tower or column with a basic solution circulated countercurrent to this gaseous mixture to remove from the gaseous mixture any traces of volatile organic boron derivatives capable of initiating the polymerization reaction. The basic solution used for treating the gaseous mixture is capable of retaining all substances which may initiate the polymerization reaction so that the monomer, upon leaving the washing tower can be compressed and condensed, thereby being subjected to relatively high temperatures without danger of polymerization prior to its reintroduction into polymerization. The basic substances used in the washing tower or towers for removal of catalyst residues from the gaseous component containing the monomer and the fluidizing substances are preferably highly basic organic compounds having a high boiling point (above the washing temperature) to avoid entrainment of the basic compound with the gaseous component. Best results are obtained with nitrogen-containing organic bases and, more specifically, the primary, secondary and cycloaliphatic amines and aromatic heterocyclic amines. Cyclohexylamine has been found to be most suitable. In general, the concentration of the basic compound should range between 0.01 and 0.1 mole/liter of aqueous solution.

One of the advantages of the process of the present invention is the high degree of crystallinity and the excellent stereoregularity of the polymer obtained by the present invention in comparison with earlier processes. Furthermore, the polymers obtained with a homogeneous granulometry and the uniform apparent density or bulk specific gravity. These improved characteristics are especially important when it is necessary to dissolve the dry polymer in, for example, the preparation of spinning solutions from which synthetic fibers are drawn. By contrast, conventional systems give rise to spongy polymers of relatively low bulk density which form gel-like masses with absorption of large quantities of solvents, whereas the homogeneous and compact granules of polymers produced in accordance with the present invention are hardly swelled by such conventional spinning solvents as cyclohexanone. The bulk density of the polymers produced in accordance with the present invention is relatively high and can be, for example, between 0.3 and 0.4 gr./cc. without difficulty. Furthermore, the coloration of the polymer and its solution in cyclohexanone, is of considerable importance when filament grade vinyl chloride polymers are involved. Thus, off-white coloration of the polymer is a sign of degradation or decomposition of the polymer and such degradation involves the other physical quantities of the fiber and filament. The coloration of a spinning solution of the polymer effectively determines the color of the fiber that will result. When reference is made hereinafter to the color of a spinning solution of a polymer, it will be understood that reference is intended to a 14 or 15 weight percent solution of the polymer in cyclohexanone, the solution being heated to a temperature of 140° C. The coloration is determined in terms of the Gardner colorimetric scale (ASTM standard 1958, part 8, pages 360, 361); with intensities corresponding to higher numbers upon the scale, a deepening of color is associated and such increasing intensity corresponds to a higher degree of degrading. Furthermore, the stability of the spinning solutions over prolonged periods is important since discoloration may occur with time even some hours after the solution has been formed.

The invention will be described in greater detail hereinafter with reference to the following specific examples and the accompanying drawing, the sole figure of which is a diagram of an apparatus for polymerizing vinyl chloride in accordance with this invention.

Referring first to the drawing, it will be seen that the apparatus basically comprises a continuously operating low-temperature polymerization autoclave 10 provided with a stirrer 11 whose motor 12 is mounted upon the removable cover 13 of the autoclave. By means not shown, the autoclave can be maintained at a temperature of, say, between −20° C. to −60° C. and is supplied continuously with a catalyst system as represented via an inlet 14 and with the monomer, fluidizer or other component as represented by the inlet 15. An outlet 16 is provided for continuously drawing a reaction-mixture effluent (containing polymer, monomer, catalyst, fluidizer) from the reaction vessel 10 whereupon this effluent can be introduced at 17 in a cascade 18 into the upper part of a separation vessel 19 whose lower portion is provided with a stirrer blade 20 driven by a motor 21. A jet of alkaline aqueous washing liquid is directed against the cascade of the reaction mixture effluent from a nozzle 21' which is supplied with the washing liquid via a circulating system including a line 22 and a pump 23. The aqueous suspension of the polymer is drawn off through a pipe 24 by a pump 25 and leads to a conventional centrifuge 26 for the separation of solids from liquids. The liquid phase is returned at 27 to the line 22 while the solid phase, consisting of the granular polymer, is removed at 28, and carried to a washing and drying stage in the usual manner. The washing liquid introduced at nozzle 21 is at a temperature of 10° to 30° C. and thus substantially instantaneously volatilizes the vinyl chloride monomer and fluidizer portions of the effluent to constitute a gaseous component which is withdrawn from the separator 19 via a line 30. From the separator, the gaseous component is fed to a packed washing tower or column 31 through which the gas passes countercurrent to an aqueous amine washing liquid circulated by pump 32 and entering the washing tower at a spray head 33. This wash liquid, which extracts any residual catalyst from the gaseous component, is carried off from the wash tower via a line 34 and may be recirculated, discharged or replenished with aqueous amine by conventional means. The purified gases are withdrawn at the upper end of the wash tower via a conduit 35 and compressed and condensed in a subsequent stage 36 prior to recycling the monomer and fluidizer to the reactor 10 as represented by line 37. Fresh monomer or fluidizer can be added at 38.

It has been found advantageous to carry out the present invention in the following manner:

Initially, the vinyl chloride monomer is introduced into the polymerization autoclave 10 which is closed via a cover 30 and flushed through suitable fixtures or fittings (not shown) with nitrogen to completely remove all traces of oxygen. One or more fluidifying or fluidizing substances as described in the copending applications mentioned above are then fed into the reactor 10 via the inlet 15. Next, the catalyst system is introduced at 14 into the reactor 10 and the mass subjected to low-temperature polymerization (preferably at a temperature of about −40° C.) to a degree of monomer conversion at which the reaction mixture is still completely fluent.

At this point, withdrawal of the polymerization phase at the bottom of the reactor is begun with the withdrawal rate and quantities being maintained constant during the balance of the reaction. The reaction-mixture effluent is a slurry of polymer, monomer, fluidizing substances and catalyst and corresponding proportions of the monomer, catalyst and fluidizer are introduced at 14 and 15 to exactly replace the quantity withdrawn; the quantity of the monomer introduced into the reactor at 15 is, of course, equal to the total molar quantity of the monomer withdrawn both in the form of polymer and as unreacted monomer. The withdrawal rate is chosen to maintain the fluidity and degree of conversion of the monomer constant.

The polymerization slurry is subjected to a jet of alkaline aqueous washing liquid, preferably sodium hydroxide solution at a concentration between 1 and 10 gr./liter and at a temperature between 10° and 30° C. The washing liquid forms a bath at the bottom of the vessel 19 which is stirred vigorously by the stirrer 20, 21. Upon withdrawal of the homogeneous polymer suspension from the chamber 19 via pipe 24, the suspension is introduced into the centrifuge 26 which separates continuously to yield a polymer which is washed with pure water and dried at a temperature between 40° and 50° C. The alkaline liquid is returned to the separator 19. The gas phase withdrawn from the separator at 30 consists of the vinyl-chloride monomer, fluidizers and small quantities of entrained catalyst and this gaseous component is washed in the packed tower 21 with the aqueous amine solution. The latter is circulated countercurrent to the gases and serves to retain the traces of catalyst while the gases continue to a recondensation and compression stage 36 in which the gases are recondensed at ambient pressure or by cooling them to a temperature below their boiling point at an elevated pressure after compression. The cold monomer and fluidizing substance are returned to the reactors via line 15 and a quantity of monomer at 38 is added to compensate for the monomer which has been converted into the polymer.

It will be understood that the following examples are given for purposes of illustration, Example I being provided for comparative purposes. Furthermore, while reference is made herein to vinyl chloride monomer and reactions producing vinylchloride polymers, it will be understood that a vinyl chloride monomer component is one consisting at least predominantly of vinyl chloride but which may contain one or more monomeric materials compatible with and copolymerizable with vinyl chloride as described in the aforementioned copending applications.

EXAMPLE I (for comparison)

20 kg. of vinyl-chloride monomer were placed in a polymerization autoclave of stainless steel, maintained at a temperature of −40° C., and having a volumetric capacity of 30 liters, this autoclave being fitted with a fast revolving stirrer.

Thereupon the overlying atmosphere was washed by alternately evacuating the vessel and introducing nitrogen, in order to remove to the greatest extent possible any air present in the autoclave. 30 g. of triethyl boron (catalyst component), 27.7 g. of ethyl ether and 28.5 g. of cumene hydroperoxide at about 82% (catalyst components) were then introduced, in succession into the autoclave.

Thereafter, the polymerization mixture was continuously withdrawn at the bottom of the reactor at the rate of 2.85 kg. per hour. Simultaneously, the reactants were continuously introduced at the following rates:

| | G./hr. |
|---|---|
| Triethyl boron | 4.29 |
| Ethyl ether | 3.25 |
| Cumene hydroperoxide at about 82% | 4.10 |
| Vinyl chloride monomer | 2850 |

After about 20 hours the conversion of the monomer to a polymer reached a constant value of about 11.5% and 330 g. of polymer and 2520 g. of vinyl chloride monomer were discharged per hour.

The mixture coming from the reactor was conveyed to a stainless steel container containing 50 liters of water at 60° C. fitted with a stirrer suited for vigorously stirring the liquid mass.

The polymer was only partially wetted by the water. By means of a pump the polymer was then fed into a centrifuge and, after separation from the water and a subsequent washing with pure water, it was then dried in an air current at 50° C. with a yield of 330 g. of polymer per hour.

The polymer thus obtained was of slightly pink color. A solution (15% by weight) of polymer in cyclohexanone, after heating for 30 minutes at 140° C. gave a colorimetric value equal to 7–8 degrees of the Gardner Scale (ASTM 1958—part VIII, pages 360–361); this coloration after further heating at 140° C. turned out to be considerably increased, i.e. to about 14–15 degrees.

The unreacted monomer, after compression and condensation at room temperature and after subsequent drying on alumina and addition of vinyl chloride in amounts corresponding to the amount of formed polymer, was recycled to the polymerization reactor.

In the pipes and systems through which the monomer, coming from the previously described polymer-monomer separator, ran the formation of polymer was observed, which, if not periodically removed, tended to deposit itself on the inside of the pipes and apparatus, thereby forming incrustations that reduced the efficiency of the apparatus themselves. The polymer apparently was the result of residual catalyst activity.

EXAMPLE II 16 kg. of vinyl chloride and 4 kg. of ethyl chloride (fluidifier) were fed into a stainless steel autoclave with a capacity of 30 liters and fitted with a fast revolving stirrer; the autoclave was cooled to a temperature of −40° C.

Thereupon, the space above the polymer was flushed with nitrogen in order to remove to the greatest extent possible the air present therein; then 28.8 g. of triethyl boron, 21.8 g. of ethyl ether and 33.2 g. cumene hydroperoxide at about 82% were introduced in this order. Immediately thereafter the polymerization slurry was continuously removed at a rate of 1.9 kg. per hour; at the same time, also continuously, the following reactants were supplied Triethyl boron—2.74 g./hr.
Ethyl ether—2.10 g./hr.
Cumene hydroperoxide at 82%—3.16 g./hr.
Vinyl chloride—1.52 kg./hr.
Ethyl chloride—0.38 kg./hr.

After about 30 hours the conversion of the monomer to polymer reached a constant value corresponding to about 22%; under these operational conditions 335 g. of polyvinyl chloride, 1185 g. of vinyl chloride monomer and 380 g. of ethyl chloride were discharged per hour. The mixture coming from the reactor was conveyed to a stainless steel vessel and there it was hit by a current of an aqueous solution containing 2 g./l. of sodium hydroxide at a temperature of 20° C. The lower part of the container was fitted with a stirrer (see the drawing) that allowed the effective renewal or recirculation of the NaOH solution in contact with the polymer thereby promoting the wetting thereof; the alkaline suspension of polymer was continuously removed from the container through a pump and conveyed to a centrifuge. The alkaline solution free from the polymer was then fed into the separating vessel, while the polymer, after washing in water, was dried by an air current at 50° C. The yield of polymer amounted to 335 g./hr.

Under these conditions, the contact time of the polymer as a suspension in the alkaline solution was very short, amounting to just a few minutes.

The resulting polymer had a white appearance. A solution of 15% by weight of polymer in cyclohexanone, obtained by heating at 140° C. for 30 minutes, had a color equal to or less than 1 degree of the Gardner Scale. After 3 hours of heating, the coloration was not greater than 3–4 degrees of the Gardner Scale.

The unreacted monomer and the ethyl chloride in the gaseous state were fed into a packed washing column, in which an aqueous solution containing 4 g. of cyclohexylamine per liter circulated in countercurrent to the gas.

The mixture of ethyl chloride and vinyl chloride, after washing, was compressed and condensed at room temperature, then dried over alumina and, after addition of vinyl chloride in a quantity corresponding to that of the formed polymer, recycled to the polymerization reactor.

Since the catalyst was fully removed from the vinyl chloride and from the ethyl chloride coming from the monomer-polymer separator, in no external point of the polymerization reactor was any development of polyvinyl chloride observed.

EXAMPLE III

Operating as in Example II, using however 4 g. of sodium carbonate per liter of water instead of 2 g. of sodium hydroxide per liter of water, an easily wettable polymer was obtained, having characteristics equal to those of the product prepared according to the preceding example.

EXAMPLE IV

Operating according to Example II, using, instead of 2 g. of sodium hydroxide per liter of water, 4 g. of disodium phosphate per liter, an easily wettable polymer was obtained having characteristics equal to those of the product prepared as described in Example II.

EXAMPLE V

Operating according to Example II, using, instead of 2 g. of sodium hydroxide per liter of water, 0.5 g. sodium laurate per liter, an easily wettable polymer was thereby obtained whose characteristics were the same as those of the product prepared according to Example II.

EXAMPLE VI

Operating according to Example II, using, instead of cyclohexylamine, an aqueous solution containing 3.5 g. of pyridine per liter of water, a polymer was obtained having the same characteristics as those of the polymer prepared according to Example II.

We claim:
1. In a process for the continuous polymerization, at a temperature below 25° C., of a monomeric component consisting predominantly of vinylchloride in the presence of a catalyst component based upon a trialkylboron by continuously feeding said monomeric component and said catalyst into a reaction vessel; continuously withdrawing therefrom an effluent portion of the reaction mixture containing the polymer, residual monomer, and catalyst; and separating and recovering the components of said effluent portion, the improvement which comprises the steps of:
   (a) intimately contacting the portion of the reaction mixture withdrawn from said reaction vessel continuously with an aqueous washing solution of a pH of at least 8 at a temperature between substantially 10° and 30° C. and containing a washing agent facilitating treatment of the polymer with said solution, said washing agent being selected from the group which consists of alkali metal and alkaline-earth metal water-soluble hydroxides, salts and surface-active salts;
   (b) concurrently and continuously vaporizing the residual monomer in the portion of the reaction mixture treated in step (a) by heat exchange with said washing solution;
   (c) separating the polymer from the aqueous mixture formed by treating said effluent with said washing liquid in step (a);
   (d) collecting the monomer-containing gases volatilized in step (b);
   (e) treating the gases collected in step (d) continuously with a basic solution adapted to retain traces of catalyst contained in said gases and containing an organic substance selected from the group which consists of primary, secondary and cycloaliphatic amines and heterocyclic aromatic amines; and
   (f) recycling the monomer from the gases treated in step (e) to said reaction vessel to constitute at least part of the monomeric component introduced thereto.

2. The improvement defined in claim 1 wherein said agent is sodium hydroxide and is present in said washing solution in an amount ranging between substantially 0.5 and 10 g. per liter of the washing solution.

3. The improvement defined in claim 1 wherein said organic substance is present in said solution of step (e) in an amount ranging from 0.01 to 10 moles per liter of said solution of step (e).

4. The improvement defined in claim 1 wherein said portion of the reaction mixture treated in step (a) with said washing solution is subjected to a jet of the latter to disperse said portion of the reaction mixture in the washing solution, and the aqueous mixture formed in step (a) is subjected to intense agitation in a bath thereof subsequent to the dispersion of said portion of said reaction mixture by said jet of washing solution, said polymer being separated from the aqueous mixture by continuous centrifugation whereby the washing solution is recovered from said aqueous mixture and is recycled to said jet to treat further quantities of the reaction mixture withdrawn from said vessel, the polymer separated from said aqueous mixture being thereafter washed and dried, said gases being treated in step (e) by passing them countercurrent to said basic solution in a washing column, the monomer recycled in step (f) being condensed prior to its introduction into the reaction vessel.

5. A polymer particularly suited for the formation of fiber made by the method of claim 1.

References Cited

UNITED STATES PATENTS

| | | | |
|---|---|---|---|
| 3,004,013 | 10/1961 | Kircher et al. | 260—92.8 |
| 3,200,066 | 8/1965 | Scoggin | 260—94.9 |
| 3,275,611 | 9/1966 | Mottus et al. | 260—87.5 |
| 3,219,641 | 11/1965 | Tegge et al. | 260—80.7 |

JOSEPH L. SCHOFER, Primary Examiner

J. A. DONAHUE, JR., Assistant Examiner

U.S. Cl. X.R.

260—87.5